United States Patent
Watanabe

(10) Patent No.: US 12,124,028 B2
(45) Date of Patent: Oct. 22, 2024

(54) LIGHT DEFLECTING DEVICE, DISPLAY DEVICE AND IMAGING DEVICE

(71) Applicant: LG Display Co., Ltd., Seoul (KR)

(72) Inventor: Kazuki Watanabe, Tokyo (JP)

(73) Assignee: LG DISPLAY CO., LTD., Seoul (KR)

(*) Notice: Subject to any disclaimer, the term of this patent is extended or adjusted under 35 U.S.C. 154(b) by 379 days.

(21) Appl. No.: 17/384,196

(22) Filed: Jul. 23, 2021

(65) Prior Publication Data

US 2022/0197016 A1 Jun. 23, 2022

(30) Foreign Application Priority Data

Dec. 22, 2020 (JP) ................. 2020-212595

(51) Int. Cl.
| | |
|---|---|
| *G02B 26/08* | (2006.01) |
| *F21V 8/00* | (2006.01) |
| *G02B 26/10* | (2006.01) |
| *G02B 27/01* | (2006.01) |

(52) U.S. Cl.
CPC ....... *G02B 26/0875* (2013.01); *G02B 6/0008* (2013.01); *G02B 26/103* (2013.01); *G02B 27/0172* (2013.01)

(58) Field of Classification Search
CPC .......... H04N 2209/046; H04N 23/843; H04N 25/134; H04N 5/142; H04N 9/64; G02B 26/0875; G02B 26/103; G02B 27/0172; G02B 6/0008; G02B 6/262; G02B 6/3504; G02B 6/32; G02B 26/10
See application file for complete search history.

(56) References Cited

U.S. PATENT DOCUMENTS

| | | | | |
|---|---|---|---|---|
| 7,129,472 | B1* | 10/2006 | Okawa | A61B 1/00165 |
| | | | | 359/201.1 |
| 7,616,986 | B2* | 11/2009 | Seibel | A61B 5/0062 |
| | | | | 250/234 |
| 2020/0014892 | A1 | 1/2020 | Wang et al. | |

FOREIGN PATENT DOCUMENTS

| | | | |
|---|---|---|---|
| JP | 2009-271437 A | 11/2009 | |
| JP | 2011-217336 A | 11/2011 | |
| JP | 2013081680 A * | 5/2013 | |
| KR | 10-2011-0000274 A | 1/2011 | |
| WO | WO-2016103793 A1 * | 6/2016 | ............... A61B 1/00 |
| WO | WO 2018/122902 A1 | 7/2018 | |

OTHER PUBLICATIONS

Machine translation of JP 2009-271487 retrieved electronically from PE2E Search Feb. 8, 2024 (Year: 2024).*
Machine translation of JP 2013081680 retrieved electronically from PE2E Search Feb. 8, 2024 (Year: 2024).*
Machine translation of WO 2016/103793 A1, retrieved electronically from PE2E Search May 29, 2024 (Year: 2024).*

* cited by examiner

*Primary Examiner* — Cara E Rakowski

(74) *Attorney, Agent, or Firm* — Birch, Stewart, Kolasch & Birch, LLP

(57) ABSTRACT

A light deflecting device includes a first optical element, a vibration applying part at an incident end portion of the first optical element and vibrating an emissive end portion of the first optical element along a first direction, and a second optical element moving along a second direction different from the first direction with a speed lower than a speed of the first optical element.

16 Claims, 8 Drawing Sheets

LIGHT DEFLECTING DEVICE, DISPLAY DEVICE AND IMAGING DEVICE

CROSS REFERENCE TO RELATED APPLICATIONS

The present application claims the priority benefit under 35 U.S.C § 119 of Japanese Patent Application No. 2020-212595 filed in Japan on Dec. 22, 2020, the entire contents of which are hereby incorporated by reference in its entirety for all purposes as if fully set forth herein into the present application.

BACKGROUND OF THE INVENTION

Field of the Invention

The present invention relates to a light deflecting device, a display device and an imaging device.

Discussion of the Related Art

Recently, a head mounted display (HMD) having a small size and a light weight has been widely developed.

A display type applied to the head mounted display can include a micro display type, a micro electro mechanical systems (MEMS) mirror type and a fiber scanning type.

The micro display type can have a disadvantage in a small size and a light weight, and the MEMS mirror type can have a disadvantage in a small size and a light weight due to a reflective type. As a result, the fiber scanning type has been the subject of recent development.

In Korean Patent Publication No. 10-2011-0000274, a two-dimensional light scanning device including two one-dimensional portable optical benches is disclosed.

A technology of a light scanning using a lens moving along a horizontal direction and a lens moving along a vertical direction is disclosed in Korean Patent Publication No. 10-2011-0000274.

However, since the lenses having a relatively great mass move, it can be difficult to drive the light scanning device with a high frequency.

As a result, it can be difficult to obtain a high resolution raster scanning.

SUMMARY OF THE INVENTION

Accordingly, the present invention is directed to a light deflecting device, a display device and an imaging device that substantially obviate one or more of the problems due to limitations and disadvantages of the related art.

An object of the present invention is to provide a small-sized light deflecting device capable of performing a high resolution raster scanning.

Additional features and advantages of the invention will be set forth in the description which follows, and in part will be apparent from the description, or can be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a light deflecting device includes a first optical element; a vibration applying part at an incident end portion of the first optical element and vibrating an emissive end portion of the first optical element along a first direction; and a second optical element moving along a second direction different from the first direction with a speed lower than a speed of the first optical element.

In another aspect, a display device includes a light deflecting device, wherein the light deflecting device includes a first optical element; a vibration applying part at an incident end portion of the first optical element and vibrating an emissive end portion of the first optical element along a first direction; and a second optical element moving along a second direction different from the first direction with a speed lower than a speed of the first optical element.

In another aspect, an imaging device includes a light deflecting device including: a first optical element; a vibration applying part at an incident end portion of the first optical element and vibrating an emissive end portion of the first optical element along a first direction; and a second optical element moving along a second direction different from the first direction with a speed lower than a speed of the first optical element; and an external lens disposed outside the light deflecting device and shaping a light emitted from the light deflecting device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
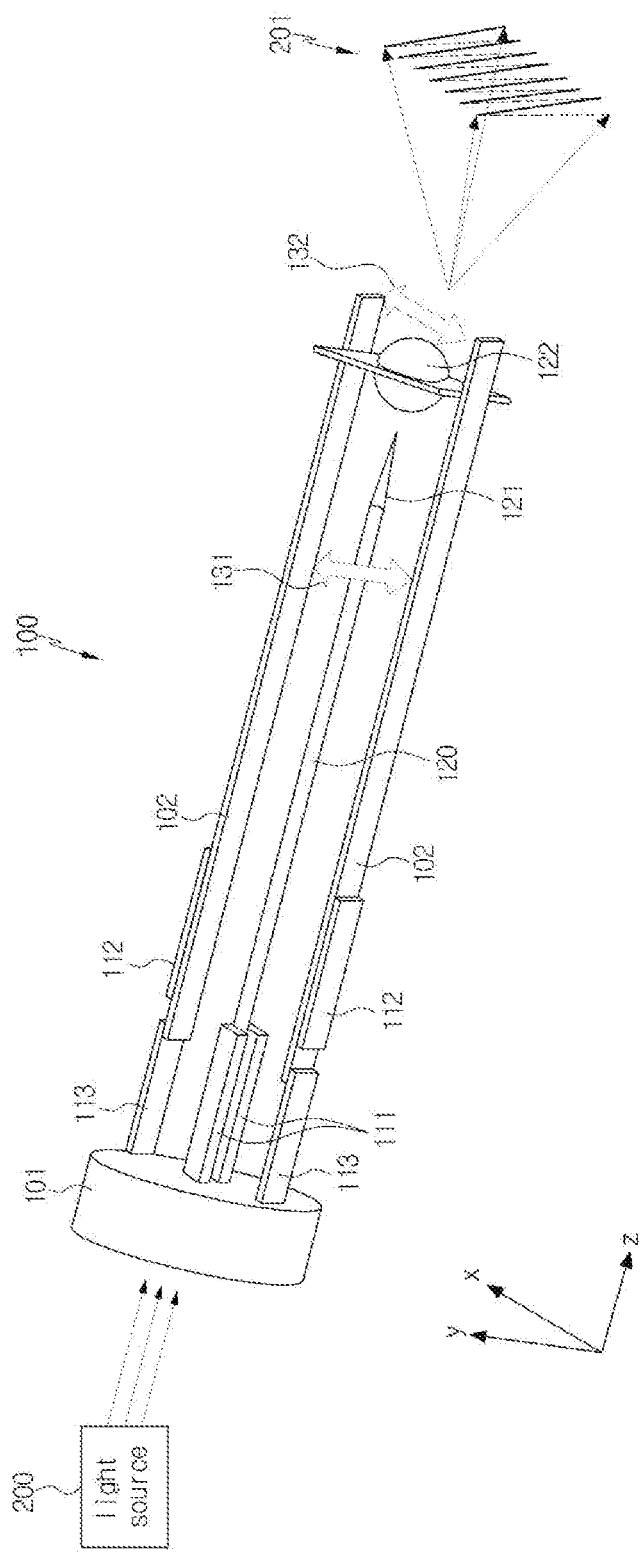
FIG. 1 is a perspective view showing a light deflecting device according to an embodiment of the present disclosure.

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following example embodiments described with reference to the accompanying drawings. The present disclosure can, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration can be omitted. In a case where terms "comprise," "have," and "include" described in the present specification are used, another part can be added unless a more limiting term, such as "only," is used. The terms of a singular form can include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts can be disposed between the two parts unless a more limiting term, such as "just" or "direct(ly)," is used.

In describing a time relationship, when the temporal order is described as, for example, "after," "subsequent," "next," or "before," a case which is not continuous can be included unless a more limiting term, such as "just," "immediate(ly)," or "direct(ly)," is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" can be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer may not only be directly connected, coupled or adhered to that other element or layer, but also be indirectly connected, coupled or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Reference will now be made in detail to the present disclosure, examples of which are illustrated in the accompanying drawings.

FIG. 1 is a perspective view showing a light deflecting device according to an embodiment of the present disclosure. All the components of each light deflecting device according to all embodiments of the present disclosure are operatively coupled and configured.

In FIG. 1, a light deflecting device 100 displays an image 201 by deflecting a light from a light source 200.

The light deflecting device 100 includes a base part 101, a supporting part 102, a first actuating part 111, a second actuating part 112, a third actuating part 113, an optical fiber part 120, a first lens part 121 as a light concentrating part and a second lens part 122.

In FIG. 1, a coordinate is defined as a right-handed coordinate system, and a direction from an incident side to an emissive side is defined as a positive direction of a z-axis. A direction of a y-axis in an xy plane perpendicular to the z-axis is defined as a first direction 131, and a direction of an x-axis is defined as a second direction 132.

The first direction 131 and the second direction 132 can be different from each other and can be perpendicular to each other.

The base part 101 has a cylindrical shape transmitting a light from the light source part 200 to an optical fiber part 120.

An end portion of the optical fiber part 120 connected to the base part 101 can be an incident end portion of the optical fiber part 120.

However, the present disclosure is not limited thereto. The optical fiber part 120 can extend to an inside of the base part 101 and can penetrate the base part 101.

Further, the shape of the base part 101 is not limited to the cylindrical shape. For example, the light source part 200 can include a laser diode.

The first actuating part 111 and the third actuating part 113 are disposed on an emissive side of the base part 101. For example, the supporting part 102 can have a plate shape, and the second lens part 122 can be disposed on the supporting part 102.

The supporting part 102 includes two members of a plate shape facing each other and supporting the second lens part 122 in FIG. 1. However, the present disclosure is not limited thereto. The number of members of the supporting part 102 may not be two and can be one or more.

Although the second lens part 122 is connected to the supporting part 102 through a flange in FIG. 1, the present disclosure is not limited thereto. The supporting part 102 and the second lens part 122 can be directly connected to each other without a flange.

The first actuating part 111 is a vibration applying part vibrating an emissive end portion of the optical fiber part 120 of a free end by movement.

The first actuating part 111 is connected to the base part 101 and the optical fiber part 120. A vibration direction of the emissive end portion is the first direction 131.

The second actuating part 112 is a driving part moving the second lens part 122 along the second direction 132. The second actuating part 112 can be connected to the third actuating part 113.

Alternatively, the second actuating part 112 can extend along a long axis direction to be directly connected to the second lens part 122.

When the second actuating part 112 is directly connected to the third actuating part 113 and the second lens part 122, the supporting part 102 can be omitted.

The third actuating part 113 is a driving part moving the second lens part 122 along the z-direction. However, the third actuating part 113 can be omitted. When the third actuating part 113 is omitted, the second actuating part 112 can be directly connected to the base part 101.

When the second actuating part 112 is directly connected to the base part 101 and the second lens part 122, the supporting part 102 can be omitted.

The first actuating part 111, the second actuating part 112 and the third actuating part 113, which can be referred to as an actuating part, can have a piezoelectric driving type, an electrostatic driving type and an electromagnetic driving type.

For example, a vibration mode such as a flexural vibration, a length vibration, a diffusion vibration, a thickness shear vibration and a thickness longitudinal vibration can be applied to a piezoelectric device of a piezoelectric driving type.

A shape and a disposition of a device used for the actuating part can vary according to a vibration mode. Further, a shape of the actuating part is not limited to the plate shape shown in FIG. 1.

For example, the actuating part can have a cylindrical shape where the optical fiber part 120 penetrates. The actuating part having a cylindrical shape has an advantage such that a position alignment is easily performed during a fabrication.

The number of the devices of the actuating part is not limited to the light deflecting device 100 in FIG. 1. Each part of the actuating part can include at least one device.

The optical fiber 120 is a member of a light guide path transmitting the light from the light source part 200 to the first lens part 121.

The first lens part 121 is a member disposed at a front end portion of the optical fiber part 120 and refracting the light transmitted by the optical fiber part 120. The first lens part 121 constitutes a first optical element with the optical fiber part 120.

The first lens part 121 can be omitted according to a purpose of the light deflecting device 100 in another embodiment.

The first optical element forms a cantilever where an incident end portion is a free end and an emissive end portion is a fixed end.

The second lens part 122 of a second optical element is a member refracting the light from the first lens part 121.

The light from the light source part 200 can be deflected by the optical fiber part 120, the first lens part 121 and the second lens part 122.

In addition, the light from the light source part 200 can be deflected by a change of a relative position of the emissive end portion of the first optical element and the second optical element.

In the optical fiber part 120 of the cantilever, a provisional vibration by the first actuating part 111 at the fixed end can be amplified to increase a displacement of a vibration of the first lens part 121.

Since the first lens part 121 vibrates with a resonant frequency of the optical fiber part 120, the first lens part 121 and the first actuating part 111, the first lens part 121 is stably driven with a high speed to restrain a flicker of an image.

The resonant frequency can include a frequency band adjacent the resonant frequency and can include any frequency to increase a displacement of a vibration using a resonance phenomenon. An order of the vibration mode is not limited to 1.

Figure 2:
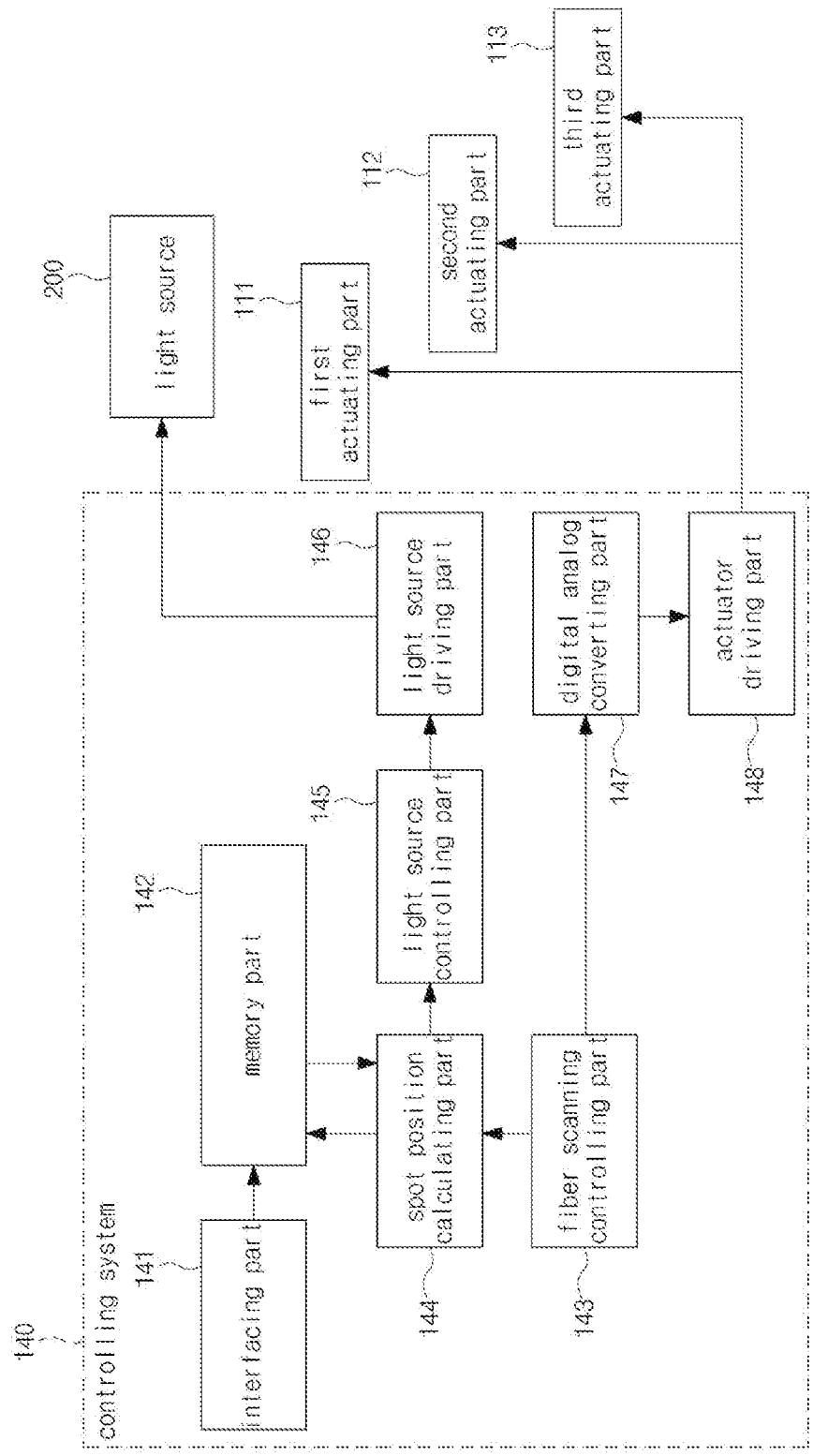
FIG. 2 is a block diagram showing a control system controlling a light deflecting device according to an embodiment of the present disclosure.

FIG. 2 is a block diagram showing a control system controlling a light deflecting device according to an embodiment of the present disclosure. All the components of the control system according to all embodiments of the present disclosure are operatively coupled and configured.

In FIG. 2, a control system 140 includes an interfacing part 141, a memory part 142, a fiber scanning controlling part 143, a spot position calculating part 144, a light source controlling part 145, a light source driving part 146, a digital analog converting part 147 and an actuator driving part 148.

The interfacing part 141 receives an image data from an exterior and transmits the image data to the memory part 142.

The memory part 142 stores the image data of the interfacing part 141. The memory part 142 can stores a data for compensation of reducing a display distortion.

The fiber scanning controlling part 1143 transmits a fiber scanning control information to the spot position calculating part 144 and the digital analog converting part 147.

The spot position calculating part 144 calculates a spot position information based on the fiber scanning control information and reads the image data in the memory part 142. The spot position calculating part 144 transmits the image data and the spot position information to the light source controlling part 145.

The light source controlling part 145 outputs a light source control information based on the image data and the spot position information.

The light source driving part 146 drives the light source 200 based on the light source control information.

The digital analog converting part 147 converts a digital type of the fiber scanning control information into an analog type.

The actuator driving part 148 drives the first actuating part 111, the second actuating part 112 and the third actuating part 113 based on the fiber scanning control information of the analog type.

An operation of the light deflecting device 100 by the first actuating part 111, the second actuating part 112 and the third actuating part 113 will be illustrated hereinafter.

Figure 3A:
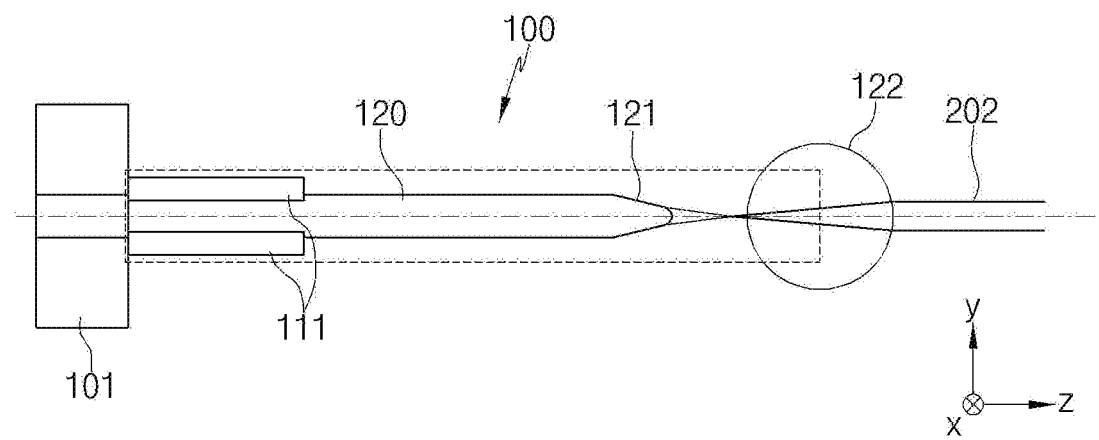
FIG. 3A is a cross-sectional view showing a light deflecting device according to an embodiment of the present disclosure when a first actuating part is not driven.
Figure 3B:
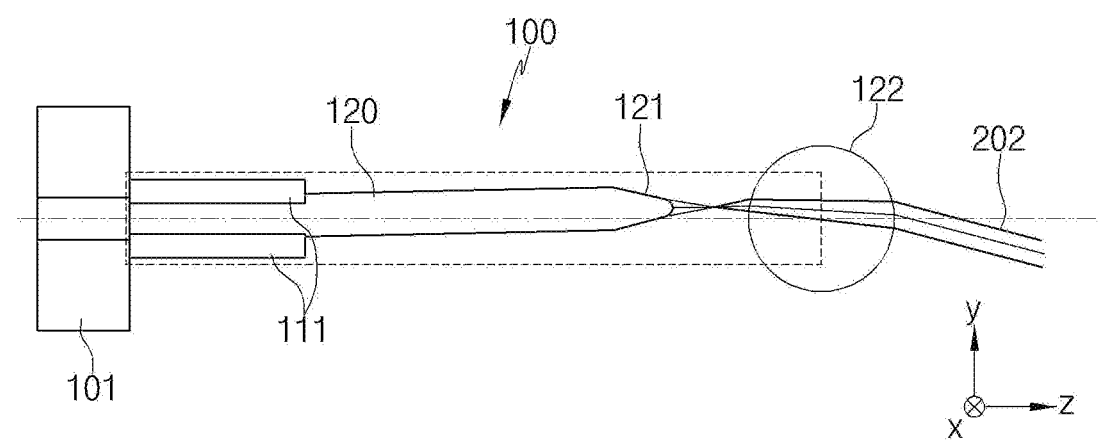
FIG. 3B is a cross-sectional view showing a light deflecting device according to an embodiment of the present disclosure when a first lens part moves along a positive direction of a first direction (y-axis) by a first actuating part.

FIG. 3A is a cross-sectional view showing a light deflecting device according to an embodiment of the present disclosure when a first actuating part is not driven, and FIG. 3B is a cross-sectional view showing a light deflecting device according to an embodiment of the present disclosure when a first lens part moves along a positive direction of a first direction (e.g., y-axis) by a first actuating part. As an example, FIGS. 3A and 3B show a yz plane perpendicular to an x-axis.

In FIGS. 3A and 3B, a base part 101, a first actuating part 111, an optical fiber part 120, a first lens part 121, a second lens part 122 and a bundle of rays 202 are shown.

The first actuating part 111 provisionally vibrates a fixed end of the optical fiber part 120, and the first lens part 121 at a free end of the optical fiber part 120 vibrates along a first direction 131 with a high speed.

Figure 4A:
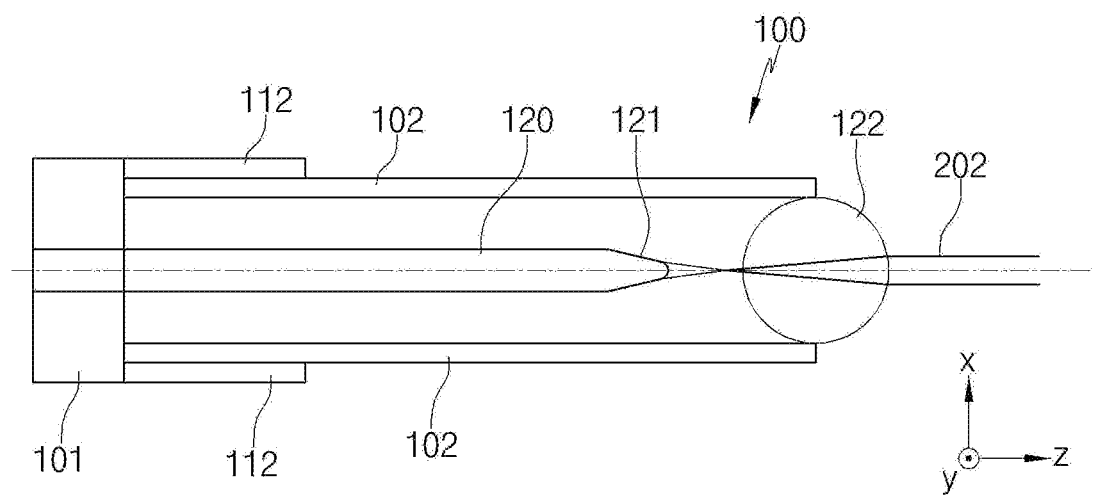
FIG. 4A is a cross-sectional view showing a light deflecting device according to an embodiment of the present disclosure when a second actuating part is not driven.
Figure 4B:
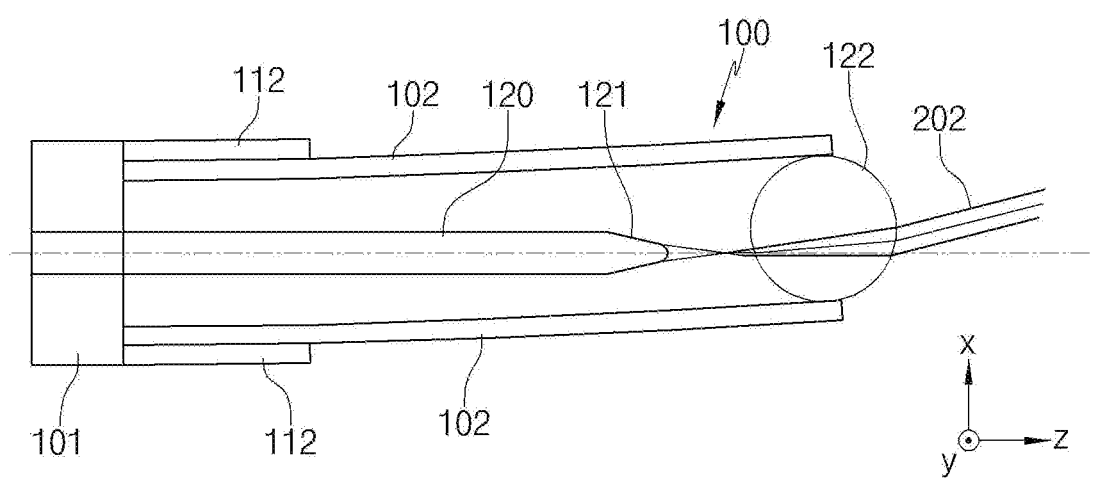
FIG. 4B is a cross-sectional view showing a light deflecting device according to an embodiment of the present disclosure when a second lens part moves along a positive direction of a second direction (x-axis) by a second actuating part.

FIG. 4A is a cross-sectional view showing a light deflecting device according to an embodiment of the present disclosure when a second actuating part is not driven, and FIG. 4B is a cross-sectional view showing a light deflecting device according to an embodiment of the present disclosure when a second lens part moves along a positive direction of a second direction (e.g., x-axis) by a second actuating part. FIGS. 4A and 4B show an xz plane perpendicular to a y axis.

In FIGS. 4A and 4B, a base part 101, a supporting part 102, an optical fiber part 120, a first lens part 121, a second lens part 122 and a bundle of rays 202 are shown.

The second actuating part 112 moves the second lens part 122 through the supporting part 102, and the second lens part 122 moves along a second direction 132 with a low speed smaller than the first lens part 121.

In FIGS. 3A, 3B, 4A and 4B, the second lens part 122 can vibrate along the first direction 131 with a high speed and can move along the second direction 132 with a low speed smaller than the high speed along the first direction 131.

The vibration along the first direction 131 can be performed with a resonant frequency of the optical fiber part 120, the first lens part 121 and the first actuating part 111.

An optimum resonant frequency can be determined by a size, a shape and a mass of each of the optical fiber part 120, the first lens part 121 and the first actuating part 111.

For obtaining the optimum resonant frequency, a pendulum can be further connected to the optical fiber part 120, the first lens part 121 or the first actuating part 111.

The movement along the second direction 132 can have various types such as a movement and a stop to a point, an interrupted movement and a continuous movement.

The movement along the second direction 132 can include a vibration with a resonant frequency the same as the movement along the first direction 131.

An optimum resonant frequency can be determined by a size, a shape and a mass of each of the second actuating part 112, the supporting part 102, the second lens part 122 and the third actuating part 113.

For obtaining the optimum resonant frequency, a pendulum can be further connected to the second actuating part 112, the supporting part 102, the second lens part 122 or the third actuating part 113.

Figure 5A:
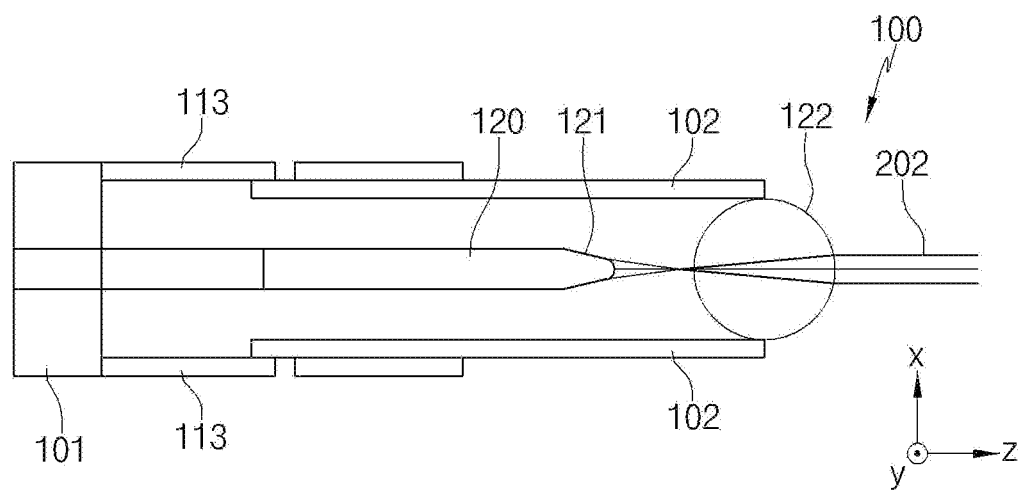
FIG. 5A is a cross-sectional view showing a light deflecting device according to an embodiment of the present disclosure when a third actuating part is not driven.
Figure 5B:
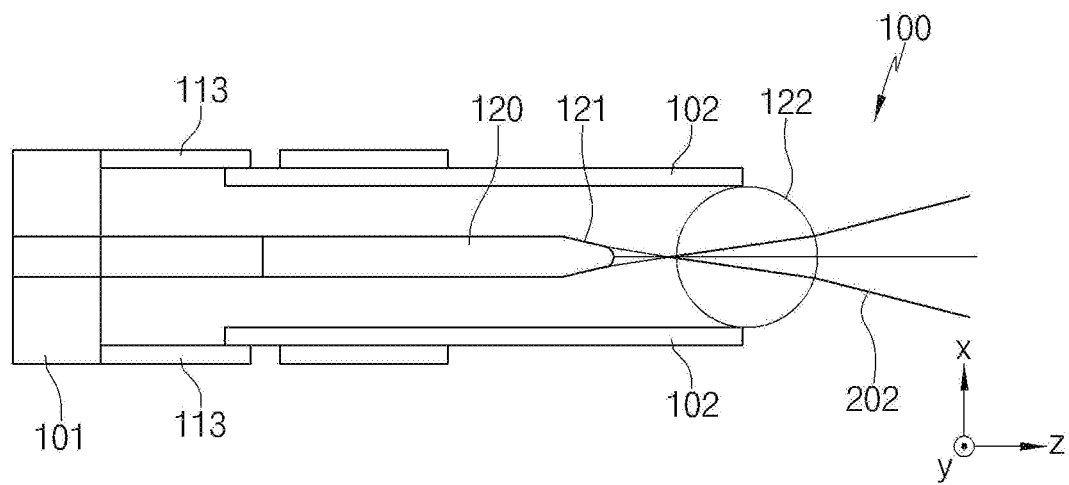
FIG. 5B is a cross-sectional view showing a light deflecting device according to an embodiment of the present disclosure when a second lens part moves along a negative direction of an z-axis by a third actuating part.
Figure 5C:
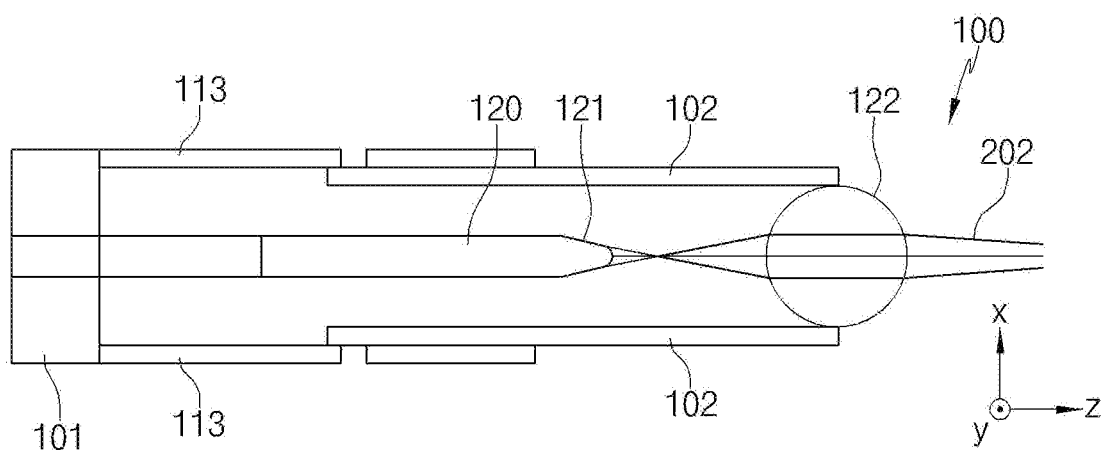
FIG. 5C is a cross-sectional view showing a light deflecting device according to an embodiment of the present disclosure when a second lens part moves along a positive direction of a z-axis by a third actuating part.

FIG. 5A is a cross-sectional view showing a light deflecting device according to an embodiment of the present disclosure when a third actuating part is not driven, FIG. 5B is a cross-sectional view showing a light deflecting device according to an embodiment of the present disclosure when a second lens part moves along a negative direction of an z-axis by a third actuating part, and FIG. 5C is a cross-sectional view showing a light deflecting device according to an embodiment of the present disclosure when a second lens part moves along a positive direction of a z-axis by a third actuating part.

In FIGS. 5A, 5B and 5C, a base part 101, a supporting part 102, an optical fiber part 120, a first lens part 121, a second lens part 122 and a bundle of rays 202 are shown.

In the third actuating part 113, since a distance between the first lens part 121 and the second lens part 122 is adjusted, a focal length can be adjusted.

The bundle of rays 202 are scanned along the first direction 131 with a high speed and are scanned along the second direction 132 with a low speed smaller than the first direction 131 to obtain a raster scanning.

Figure 6:
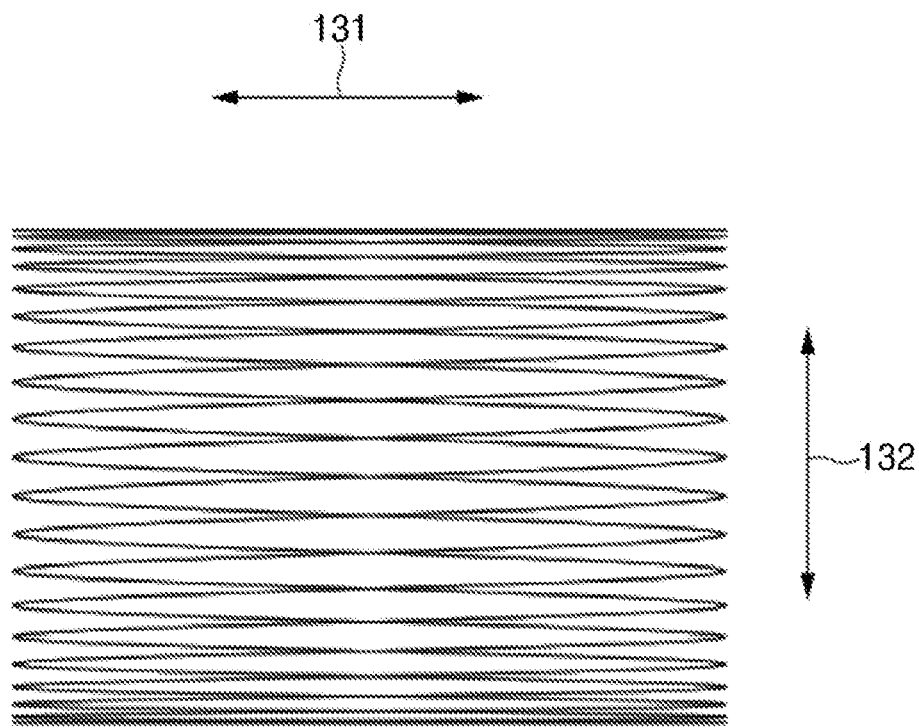
FIG. 6 is a view showing a raster scanning when a light deflecting device according to an embodiment of the present disclosure draws a two-dimensional image.

FIG. 6 is a view showing a raster scanning when a light deflecting device according to an embodiment of the present disclosure draws a two-dimensional image.

A light deflecting device 100 according to an embodiment of the present disclosure can scan a light along a first direction 131 with a high speed along a second direction 132 with a low speed smaller than the first direction 131.

As a result, in FIG. 6, a scan line is generated along the first direction 131 by a one-dimensional scanning along the first direction 131, and a scan line is generated along the first direction 131 by a one-dimensional scanning along the first direction 131 after a movement along the second direction 132.

A two-dimensional image shown in FIG. 6 can be drawn by repetition of the above movement. A three-dimensional image can be drawn by adjustment of a focal length using a third actuating part 113.

A first lens part 121 of the light deflecting device 100 according to an embodiment of the present disclosure is not limited to a specific shape and can have various shapes.

Figure 7A:
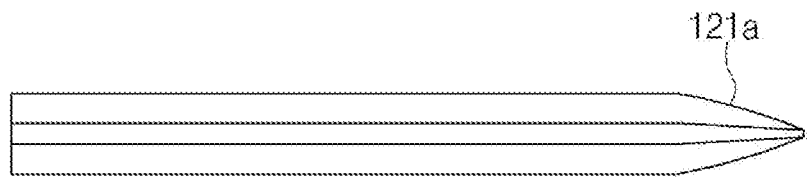
FIGS. 7A, 7B and 7C are views showing a first lens part of a deflecting device according to an embodiment of the present disclosure.
Figure 7B:
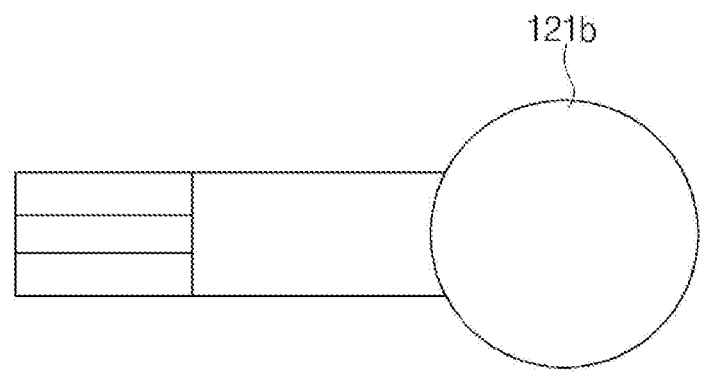
Figure 7C:
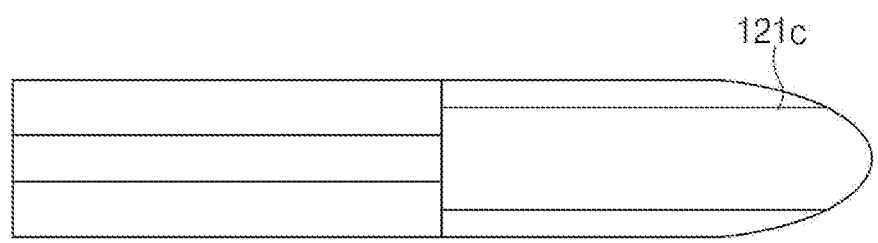

FIGS. 7A, 7B and 7C are views showing a first lens part of a deflecting device according to an embodiment of the present disclosure.

More specifically, in FIG. 7A, a first lens part 121a includes a lens having a front end of a sharp conical shape.

In FIG. 7B, a first lens part 121b includes a lens having a front end of a spherical shape.

In FIG. 7C, a first lens part 121c includes a lens having a front end of a round conical shape.

The first lens parts 121a, 121b and 121c can be applied to a light deflecting device 100 according to an embodiment of the present disclosure.

The first lens part 121 of the light deflecting device 100 according to an embodiment of the present disclosure is not limited to a specific material. The first lens part 121 can include a gradient index lens or an assembling lens.

Similarly to the first lens part 121, the second lens part 122 of the light deflecting device 100 according to an embodiment of the present disclosure is not limited to a specific shape and can have various shapes.

Similarly to the first lens part 121, the second lens part 122 of the light deflecting device 100 according to an embodiment of the present disclosure is not limited to a specific material. The second lens part 122 can include a gradient index lens or an assembling lens.

The first lens part 121 and the second lens part 122 can be selected according to a purpose of the light deflecting device 100, and the first lens part 121 can be omitted according to a purpose of the light deflecting device 100.

To increase a resonant frequency and a scanning speed of the first optical element, a lens having a relatively light-weight can be applied to the first lens part 121.

In the light deflecting device 100 according to an embodiment of the present disclosure, a high resolution raster scanning can be obtained by a fiber scanning method.

For example, the light deflecting device 100 can be applied to a display device such as a head mounted display.

Figure 8:
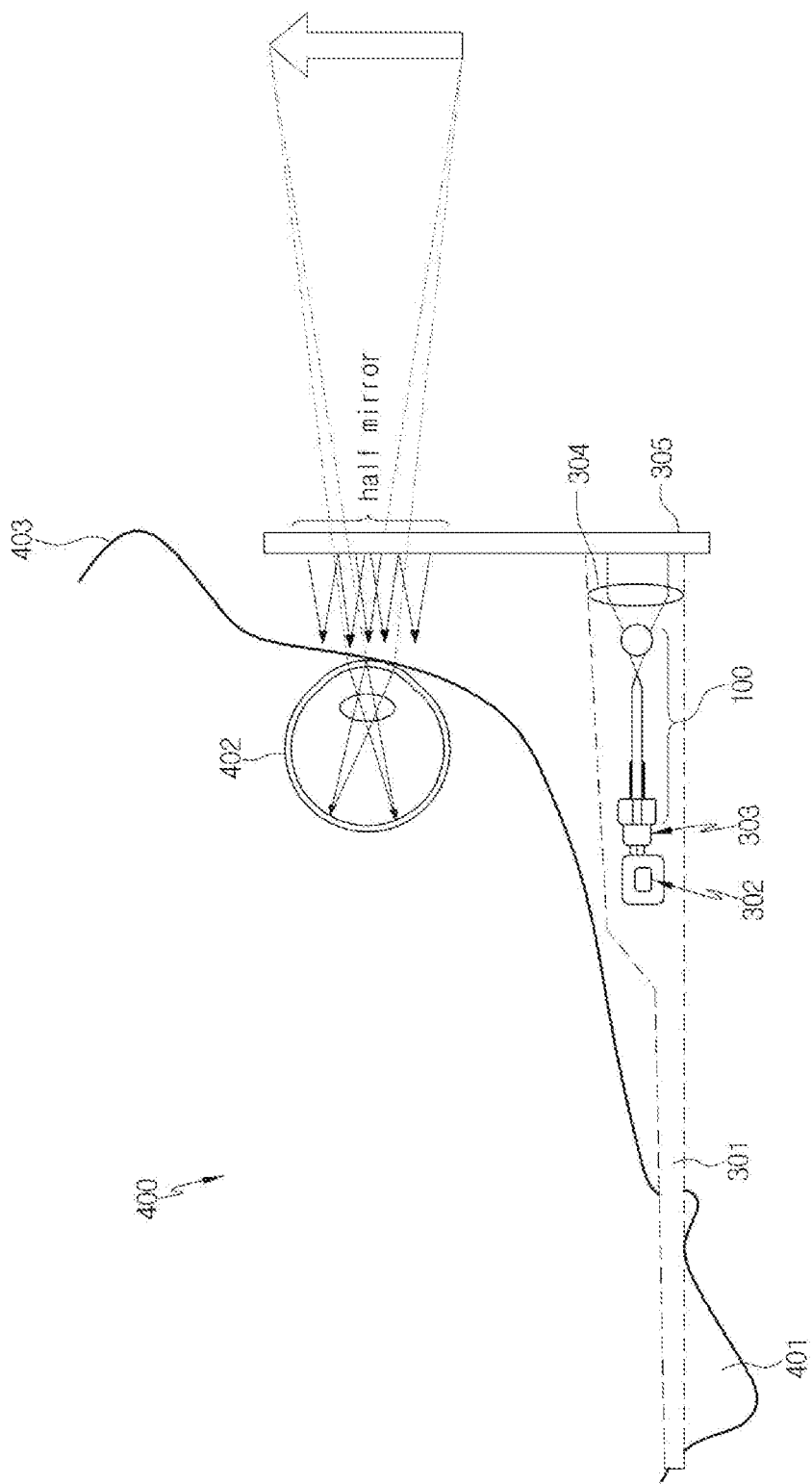
FIG. 8 is a view showing a head mounted display including a light deflecting device according to an embodiment of the present disclosure.

FIG. 8 is a view showing a head mounted display including a light deflecting device according to an embodiment of the present disclosure. Particularly, FIG. 8 shows a cross-section of a head mounted display 300 worn by a user 400.

In FIG. 8, the head mounted display 300 includes a light deflecting device 100, a temple part 301, a control integrated circuit (IC) 302, a laser diode 303, an external lens 304 and a light guiding part 305. The user wears the head mounted display 300 by hanging the temple part 301 on an ear 401.

The control IC 302, the laser diode 303 and the external lens 304 are disposed in the temple part 301.

The control IC 302 corresponds to the control system 140 of FIG. 2, and the laser diode 303 corresponds to the light source 200 of FIGS. 1 and 2.

The external lens 304 is disposed outside the light deflecting device 100. The external lens 304 can include a projection lens shaping a light emitted from the light deflecting device 100 before the light enters the light guiding part 305.

A projection shape such as a view angle can be changed by the external lens 304.

The light shaped by the external lens 304 enters the light guiding part 305 and is transmitted to a front of a right eye 402 of the user 400 in the light guiding part 305.

Since the light guiding part 305 includes a half mirror at the front of the right eye 402, the user 400 can recognize an image displayed by the head mounted display 300 and a front environment at the same time. As a result, a head mounted display having a relatively high resolution can be obtained.

Although the light deflecting device 100 is applied to a display device in an embodiment, the light deflecting device 100 can be applied to an imaging device in another embodiment.

The imaging device for shooting a photograph or a film can be obtained by disposing a photoelectric transformation element such as a photo diode instead of a light source 200.

A subject can be disposed such that a light from the subject passes through a second optical element, a first optical element and the photoelectric transformation element. As a result, a passage direction of the light in the image device is opposite to a passage direction of the light in the display device.

In the imaging device, the external lens includes an object lens.

A micro display type applied to a conventional head mounted display can have a disadvantage in a small size and a light weight, and a micro electro mechanical system (MEMS) mirror type applied to a conventional head mounted display can have a disadvantage in a small size and a light weight due to a reflective type.

A fiber scanning type applied to a conventional head mounted display can have a disadvantage in a raster scanning. As a result, a uniformity of a luminance can be reduced and a complex driving control can be needed for a scanning shape of a rectangle.

A conventional light scanning device where a lens moving along a horizontal direction and a lens moving along a vertical direction are driven by an actuator has been suggested. However, in the conventional light scanning device, since a high frequency driving is impossible due to a mass of the lenses, a high resolution raster scanning is not performed.

In one or more embodiments of the present disclosure, a small-sized light deflecting device where a high resolution raster scanning is performed is obtained.

In one or more embodiments of the present disclosure, an end portion of a region where a scanning line scans can correspond to a non-display area and a region except for the end portion can correspond to a display area.

In one or more embodiments of the present disclosure, when an end portion of a region where a scanning line scans is a non-display area and a region except for the end portion is a display area, a display distortion of an image in the display area can be reduced.

In one or more embodiments of the present disclosure, since the first lens part and the second lens part are disposed on the optical fiber, the light deflecting device having a relatively small size and a relatively light weight is obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light deflecting device comprising:
   a first optical element;
   a first actuating part disposed at an incident end portion of the first optical element and configured to vibrate an emissive end portion of the first optical element along a first direction;
   a second optical element disposed over the emissive end portion of the first optical element;
   a second actuating part configured to move the second optical element along a second direction different from the first direction with a speed lower than a speed of the first optical element;
   a third actuating part configured to move the second optical element along a third direction different from the first and second directions; and
   a fixed base part disposed at the incident end portion of the first optical element,
   wherein the first actuating part is disposed on the fixed base part.

2. The light deflecting device of claim 1, wherein the second optical element includes a lens.

3. The light deflecting device of claim 1, wherein the first optical element includes a light concentrating part adjacent to the second optical element.

4. The light deflecting device of claim 1, wherein the first optical element vibrates with a resonant frequency.

5. The light deflecting device of claim 1, wherein the first optical element includes an optical fiber of a light guide path.

6. The light deflecting device of claim 1, wherein the first direction and the second direction are perpendicular to each other.

7. The light deflecting device of claim 1, further comprising a supporting part supporting the second optical element,
wherein the third actuating part is connected to the fixed base part,
wherein the supporting part is connected to the third actuating part, and
wherein the second actuating part is connected to the supporting part.

8. The light deflecting device of claim 1, wherein the third direction is perpendicular to the first and second directions.

9. The light deflecting device of claim 7, wherein the first actuating part is disposed at a central portion of the fixed base part, and
wherein the third actuating part is disposed at an edge portion of the fixed base part.

10. The light deflecting device of claim 7, wherein the fixed base part has a cylindrical shape and the supporting part has a plate shape.

11. The light deflecting device of claim 7, wherein the supporting part directly contacts the second optical element.

12. The light deflecting device of claim 1, further comprising a light source part provided to transmit a light,
wherein the fixed base part is configured to receive the light transmitted by the light source part and transmit the light to the first optical element.

13. The light deflecting device of claim 1, wherein the second optical element is in a spherical shape.

14. A display device comprising a light deflecting device, wherein the light deflecting device comprises:
a first optical element;
a first actuating part disposed at an incident end portion of the first optical element and configured to vibrate an emissive end portion of the first optical element along a first direction;
a second optical element disposed over the emissive end portion of the first optical element;
a second actuating part configured to move the second optical element along a second direction different from the first direction with a speed lower than a speed of the first optical element;
a third actuating part configured to move the second optical element along a third direction different from the first and second directions; and
a fixed base part disposed at the incident end portion of the first optical element, and
wherein the first actuating part is disposed on the fixed base part.

15. An imaging device comprising:
a light deflecting device comprising:
a first optical element;
a first actuating part disposed at an incident end portion of the first optical element and configured to vibrate an emissive end portion of the first optical element along a first direction;
a second optical element disposed over the emissive end portion of the first optical element;
a second actuating part configured to move the second optical element along a second direction different from the first direction with a speed lower than a speed of the first optical element;
a third actuating part configured to move the second optical element along a third direction different from the first and second directions; and
a fixed base part disposed at the incident end portion of the first optical element, wherein the first actuating part is disposed on the fixed base part, and
an external lens disposed outside the light deflecting device and configured to shape a light emitted from the light deflecting device.

16. A light deflecting device comprising:
a first optical element;
a first actuating part disposed at an incident end portion of the first optical element and configured to vibrate an emissive end portion of the first optical element along a first direction;
a second optical element disposed over the emissive end portion of the first optical element;
a second actuating part configured to move the second optical element along a second direction different from the first direction with a speed lower than a speed of the first optical element; and
a fixed base part disposed at the incident end portion of the first optical element,
wherein the first actuating part is disposed on the fixed base part, and
wherein the second actuating part is disposed on the fixed base part.

* * * * *